United States Patent
O'Connell et al.

(10) Patent No.: US 7,689,774 B2
(45) Date of Patent: Mar. 30, 2010

(54) SYSTEM AND METHOD FOR IMPROVING THE PAGE CROSSING PERFORMANCE OF A DATA PREFETCHER

(75) Inventors: Francis Patrick O'Connell, Austin, TX (US); Jeffrey A. Stuecheli, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 521 days.

(21) Appl. No.: 11/697,493

(22) Filed: Apr. 6, 2007

(65) Prior Publication Data

US 2008/0250208 A1  Oct. 9, 2008

(51) Int. Cl.
*G06F 12/00* (2006.01)
*G06F 13/00* (2006.01)
*G06F 13/28* (2006.01)
*G06F 9/26* (2006.01)
*G06F 9/34* (2006.01)
*G06F 15/00* (2006.01)
*G06F 9/30* (2006.01)
*G06F 9/40* (2006.01)

(52) U.S. Cl. .............. 711/137; 711/140; 711/213; 712/206; 712/207

(58) Field of Classification Search ........... 711/137
See application file for complete search history.

(56) References Cited

U.S. PATENT DOCUMENTS

2006/0179236 A1\* 8/2006 Shafi ................ 711/137
2006/0248279 A1\* 11/2006 Al-Sukhni et al. ....... 711/137
2008/0288751 A1\* 11/2008 Kocev ................ 712/207

OTHER PUBLICATIONS

Dreslinski et al. Analysis of Harware Prefetching Across Virtual Page Boundaries. May 7, 2007. ACM. pp. 13-21.\*

\* cited by examiner

*Primary Examiner*—Christian P Chace
*Assistant Examiner*—Ryan Bertram
(74) *Attorney, Agent, or Firm*—VanLeeuwen & VanLeeuwen; Diana R. Gerhardt

(57) ABSTRACT

A system and method for improving the page crossing performance of a data prefetcher is presented. A prefetch engine tracks times at which a data stream terminates due to a page boundary. When a certain percentage of data streams terminate at page boundaries, the prefetch engine sets an aggressive profile flag. In turn, when the data prefetch engine receives a real address that corresponds to the beginning/end of a new page, and the aggressive profile flag is set, the prefetch engine uses an aggressive startup profile to generate and schedule prefetches on the assumption that the real address is highly likely to be the continuation of a long data stream. As a result, the system and method minimize latency when crossing real page boundaries when a program is predominately accessing long streams.

20 Claims, 8 Drawing Sheets

SYSTEM AND METHOD FOR IMPROVING THE PAGE CROSSING PERFORMANCE OF A DATA PREFETCHER

BACKGROUND OF THE INVENTION

1. Technical Field

The present invention relates to a system and method for improving the page crossing performance of a data prefetcher. More particularly, the present invention relates to a system and method for identifying a time at which a data stream's prefetched cache lines approach the end of a real page, and aggressively prefetch the data stream's subsequent cache lines that resume on a different real page of data.

2. Description of the Related Art

Microprocessors use a prefetch engine to anticipate upcoming program requirements for data located in distant caches and system memory. By using a prefetch engine, a microprocessor prefetches data and locates the data in local cache when the program calls for the data. This mitigates substantial latency associated with retrieving the data if, instead, the microprocessor waits until the program calls for the data.

A microprocessor may use a data stream prefetch engine to detect data streams, which may be defined as a sequence of storage accesses that reference a contiguous set of cache lines in an increasing or decreasing manner. In response to detecting a data stream, a prefetch engine is configured to begin prefetching data up to a predetermined number of cache lines ahead of the data currently in process. Data stream prefetch engines, however, are often implemented such that they prefetch only up to the end of a real page of data, which greatly simplifies their implementation due to the fact that the prefetch engines are not required to track effective addresses of the data streams or retranslate addresses within a data stream.

A challenge found is that when a data stream crosses a page boundary, the continuation of the stream in a new real page appears like a new data stream altogether. In current implementations, a new stream startup profile is typically "conservative" in nature. A conservative startup profile does not start prefetching cache lines until the application loads data that causes at least two consecutive cache lines to miss the cache, and begins prefetching ahead of the line currently being loaded by the program slowly, gradually prefetching farther ahead as the application loads more and more lines along the stream until it is prefetching the desired lines ahead of the demand loads.

For example, when an existing prefetch engine is in a conservative, or "normal" startup profile and a program loads line "I," the prefetch engine speculates that the program might next load line I+1 and record the address for line I+1 in a prefetch request queue. When the program sometime later loads an address in line I+1, the prefetch logic detects the load and might send an L1 prefetch for line I+2 while also setting the address in the prefetch request queue to line I+2 (advancing the address in the request queue to the next line it expects the program to load). When the program later loads an address from line I+2, the prefetcher might send an L1 prefetch for line I+3, and L2 prefetches for lines I+4 and I+5, etc. Note, however, that the prefetch engine does not prefetch across a page boundary. As such, once the prefetch engine reaches a page boundary, the prefetch engine terminates its prefetching.

A challenge found is that for a long stream that crosses one or more page boundaries, the data stream interruption and the process of reacquiring the data stream impairs performance by adding stalls equal to multiples of the memory latency due to added cache misses at the beginning of each page and the re-ramping of the prefetches.

What is needed, therefore, is a system and method that improves the page crossing performance of a data prefetch engine.

SUMMARY

It has been discovered that the aforementioned challenges are resolved using a system and method for using an aggressive startup profile when a program accesses a cache line at a new page boundary and a suitable percentage of prior data streams have terminated at page boundaries. A prefetch engine tracks times at which a data stream terminates due to a page boundary. When a certain percentage of data streams terminate at page boundaries, the prefetch engine sets an aggressive profile flag. In turn, when the data prefetch engine receives a real address that corresponds to the beginning/end of a new page, and the aggressive profile flag is set, the prefetch engine uses an aggressive startup profile to generate and schedule prefetches due to the fact that the real address is highly likely to be the continuation of a long data stream. As a result, the system and method minimize latency when crossing real page boundaries when a program predominately accesses long streams, and switches back to a normal startup profile when data streams are short and less frequently crossing page boundaries.

A load store unit receives a load or store instruction from instruction memory. When the instruction is a load instruction, the load store unit sends a corresponding real address to a prefetch engine. The prefetch engine receives the real address and checks whether a prefetch request queue entry located in a prefetch request queue includes a matching address.

When the prefetch engine identifies a matching address in one of the prefetch request queue entries, the prefetch engine advances the state of the matched prefetch request queue entry, which includes advancing the address in the matched prefetch request queue entry to the address of an expected next line in a data stream, and generating a set of prefetch requests according to its state. The prefetch engine then conditionally sets a page boundary value bit (register) based upon whether the stream terminates at a page boundary (e.g., the first/last line in a page for a descending/ascending stream, respectively).

When the prefetch engine determines that the real address is not included in one of the prefetch request queue entries, the prefetch engine detects whether the real address corresponds to a cache line currently within an L1 data cache or whether the real address is included in a load miss queue. If either instance is true, thus indicating that the real address has been previously processed, the prefetch engine disregards the real address and waits for another real address to process. When the real address does not correspond to a cache line currently within the L1 data cache and is not included in the load miss queue, the prefetch engine proceeds through a series of steps to determine whether to start prefetching based upon a normal startup profile or an aggressive startup profile.

First, the prefetch engine selects a prefetch request queue entry located in the prefetch request queue based upon a least-recently-used (LRU) algorithm to install an address corresponding to a next expected address (either N+1 if the stream is predicted to be ascending or N−1 if the stream is predicted to be descending). The LRU algorithm identifies a prefetch request queue entry that has not had an address match in the longest number of cycles compared with the other prefetch request queue entries. The prefetch engine then pushes a page boundary value of "0" or "1" from the entry's page boundary value bit into a FIFO queue and resets the page boundary value to "0".

Next, the prefetch engine computes a "historical page boundary percentage" by calculating the percentage of page boundary values included in the FIFO queue that are "1" versus those that are a "0." The calculation identifies the percentage of times that a previous address historically reached a page boundary. Once calculated, the prefetch engine determines whether the historical page boundary percentage is greater than a historical page boundary threshold, such as 70%. When the historical page boundary percentage is greater than the historical page boundary threshold, the prefetch engine sets an "aggressive profile flag." Next, the prefetch engine identifies whether the address is the first or last cache line in a page and if so, whether the predicted direction is compatible with a data stream (e.g., if the address is the first cacheline in a page and the data stream is ascending).

When the address is a candidate for an aggressive startup profile and the aggressive profile flag is set, the prefetch engine generates and schedules a set of prefetch requests according to an "aggressive" startup profile, which minimizes latencies and improves the data stream's page-crossing performance.

The foregoing is a summary and thus contains, by necessity, simplifications, generalizations, and omissions of detail; consequently, those skilled in the art will appreciate that the summary is illustrative only and is not intended to be in any way limiting. Other aspects, inventive features, and advantages of the present invention, as defined solely by the claims, will become apparent in the non-limiting detailed description set forth below.

BRIEF DESCRIPTION OF THE DRAWINGS

The present invention may be better understood, and its numerous objects, features, and advantages made apparent to those skilled in the art by referencing the accompanying drawings.

DETAILED DESCRIPTION

The following is intended to provide a detailed description of an example of the invention and should not be taken to be limiting of the invention itself. Rather, any number of variations may fall within the scope of the invention, which is defined in the claims following the description.

Figure 1:
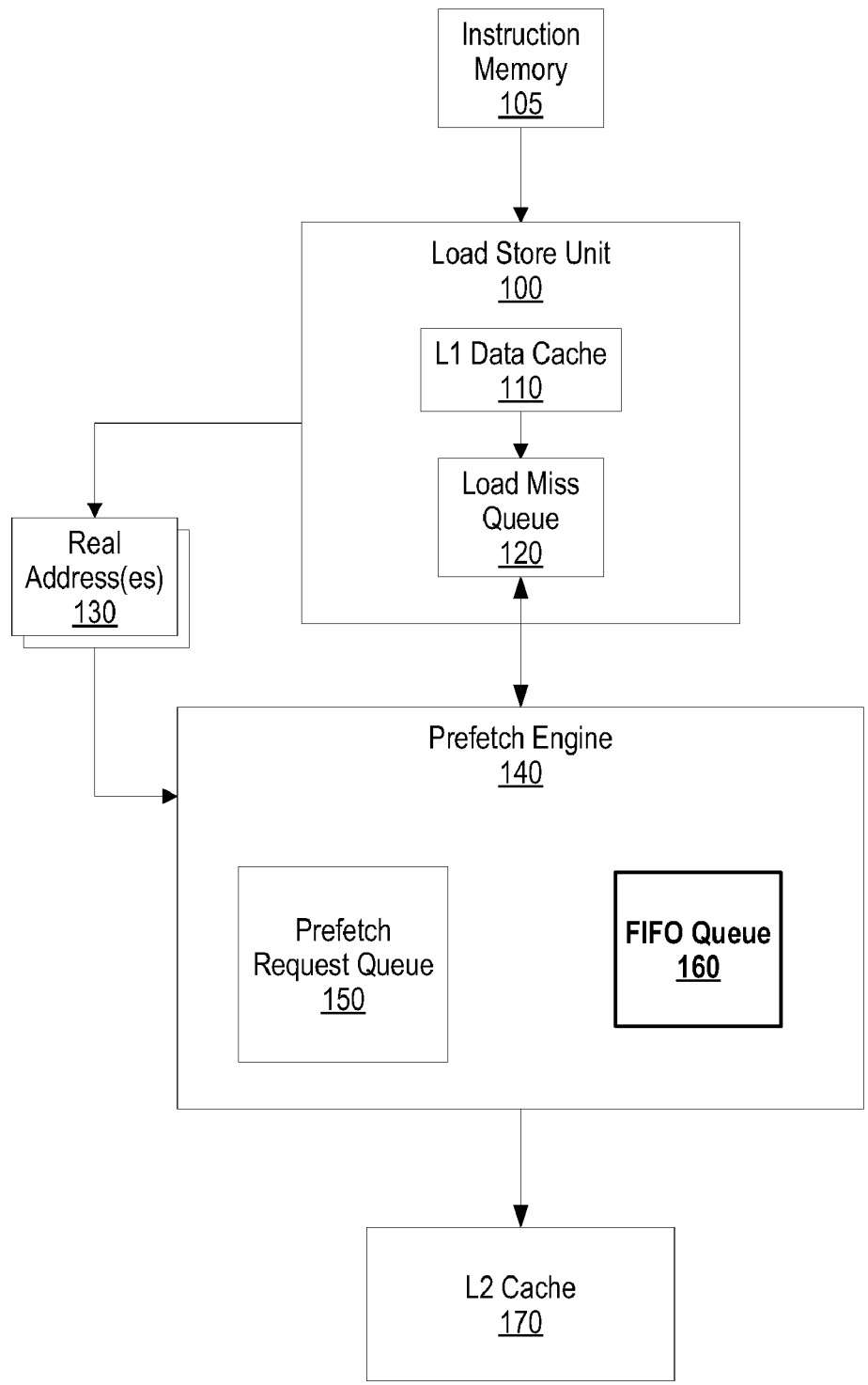
FIG. 1 is a diagram showing a prefetch engine tracking times at which data streams reach a page boundary, and aggressively prefetch cachelines at the start of prefetching data from a new real page when a historical page boundary percentage exceeds a historical page boundary threshold.

FIG. 1 is a diagram showing a prefetch engine tracking times at which data streams reach a page boundary, and aggressively prefetch cachelines at the start of prefetching data from a new real page when a historical page boundary percentage exceeds a historical page boundary threshold.

Load store unit 100 receives a load or store instruction from instruction memory 105. When the instruction is a load instruction, load store unit 100 sends corresponding real address 130 to prefetch engine 140. Prefetch engine 140 receives real address 130 and checks whether a prefetch request queue entry located in prefetch request queue 150 includes a matching address.

When prefetch engine 140 identifies a matching address in one of the prefetch request queue entries, prefetch engine 140 advances the state of the matched prefetch request queue entry, which includes advancing the address in the matched prefetch request queue entry to the address of an expected next line in a data stream, and generating a set of prefetch requests according to its state. For example, if the current real address included in the prefetch request queue entry corresponds to cache line N, then processing replaces N with an address of line N+1 for an ascending stream, or with an address of line N−1 for a descending stream. Some of the prefetch requests may be targeted for L1 cache 110, and others may be targeted for L2 cache 170.

In a special case where the address from the load is the last line in a page for an ascending stream, or the first line in the page for a descending stream, a page boundary value bit (register) included in the prefetch request queue entry is set to a "1", otherwise it is left at a value of "0". This value is later used to determine the start-up profile of a new stream (discussed below).

When prefetch engine 140 determines that real address 130 is not included in one of the prefetch request queue entries, prefetch engine 140 detects whether the real address corresponds to a cache line currently within L1 data cache 110 or whether the real address is included in load miss queue 120. If either instance is true, thus indicating that real address 130 has been previously processed, prefetch engine 140 disregards real address 130 and waits for another real address 130 to process.

When the real address does not correspond to a cache line currently within L1 data cache 110 and is not included in load miss queue 120, prefetch engine 140 proceeds through a series of steps to determine whether to start prefetching based upon a normal startup profile or an aggressive startup profile. First, prefetch engine 140 selects a prefetch request queue entry located in prefetch request queue 150 based upon a least-recently-used (LRU) algorithm to install an address corresponding to a next expected address (either N+1 if the stream is predicted to be ascending or N−1 if the stream is predicted to be descending). The LRU algorithm identifies a prefetch request queue entry that has not had an address match in the longest number of cycles compared with the other prefetch request queue entries. Prefetch engine 140 then pushes the page boundary value of "0" or "1" from the identified entry's page boundary value bit into FIFO queue 160 and then resets the boundary value bit to "0".

Figure 5:
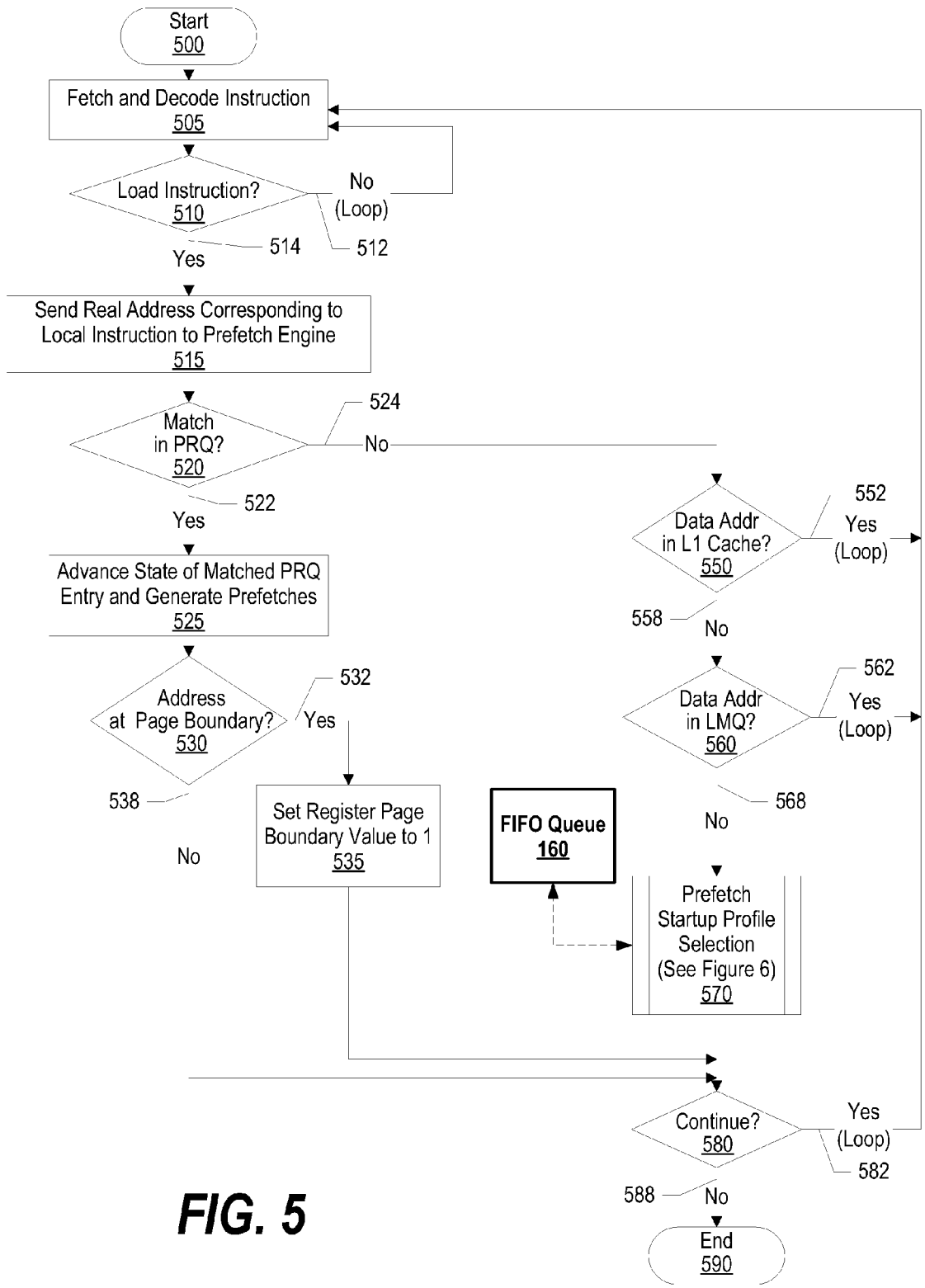
FIG. 5 is a flowchart showing steps taken in processing a load instruction.

Next, prefetch engine 140 computes a "historical page boundary percentage" by calculating the percentage of page boundary values included in FIFO queue 160 that are "1" versus those that are a "0." The calculation identifies the percentage of times that a previous stream address historically reached a page boundary (see FIG. 5 and corresponding text for further details).

Once calculated, prefetch engine 140 determines whether the historical page boundary percentage is greater than a historical page boundary threshold, such as 70%. When the historical page boundary percentage is greater than the historical page boundary threshold, prefetch engine 140 sets an "aggressive profile flag." Next, prefetch engine 140 identifies whether the address is the first or last cache line in a page and if so, whether the predicted direction is compatible with a data stream (e.g., if the address is the first cacheline in a page and the data stream is ascending).

When the address corresponding to the load instruction is a candidate for an aggressive startup profile and the aggressive profile flag is set, prefetch engine 140 generates and schedules a set of prefetch requests according to an "aggressive" startup profile (see FIG. 6 and corresponding text for further details), which minimizes latencies and improves the data stream's page-crossing performance.

Figure 2:
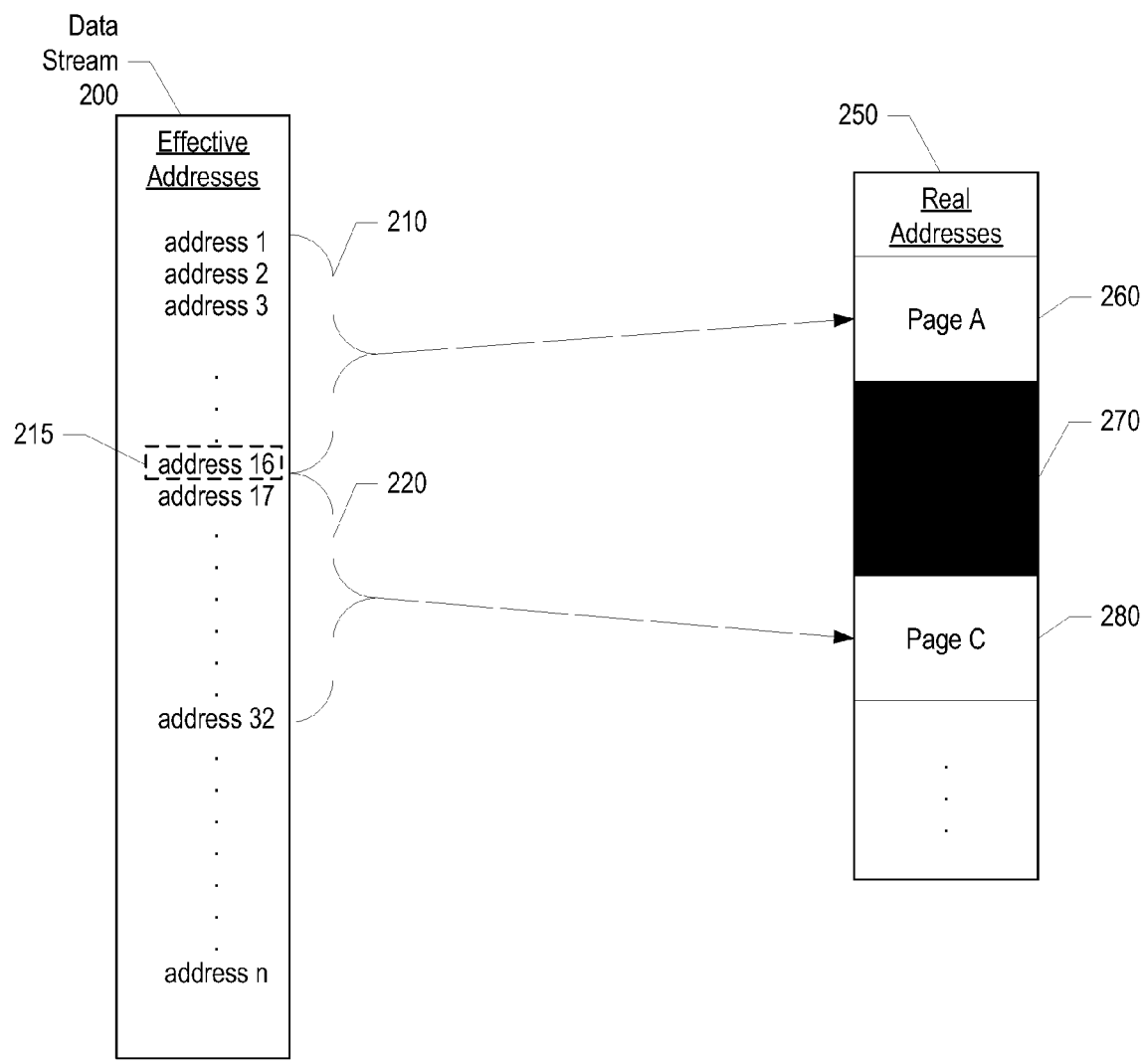
FIG. 2 is a diagram showing effective addresses included in a data stream that are translated to discontiguous real addresses.

FIG. 2 is a diagram showing effective addresses included in a data stream that are translated to discontiguous real addresses. A computer system translates effective addresses included in data stream 200 to real addresses during load operations in order to retrieve data from physical memory 250.

Data stream 200 includes contiguous effective addresses. As can be seen, the number of effective addresses is larger than the number of cache lines that reside on a real page. As a result, data stream 200 spans across multiple real pages when translated. The example in FIG. 2 shows that effective addresses 210 are translated to real page A 260, and effective addresses 220 are translated to real page C 280.

Data stream 200 includes effective address 215 and effective address 225, which are contiguous addresses. However, since memory area 270 is not available, which may include one or more real pages, page A 260 and page C 280 are discontiguous. Therefore, when a prefetch engine receives a real address corresponding to effective address 215, which is at a page boundary, the prefetch engine sets a page boundary value bit to "1". This value is later pushed into a FIFO queue, such as FIFO queue 160 shown in FIG. 1 (see FIG. 5 and corresponding text for further details) at the time the prefetch engine selects this queue entry for replacement.

Figure 3:
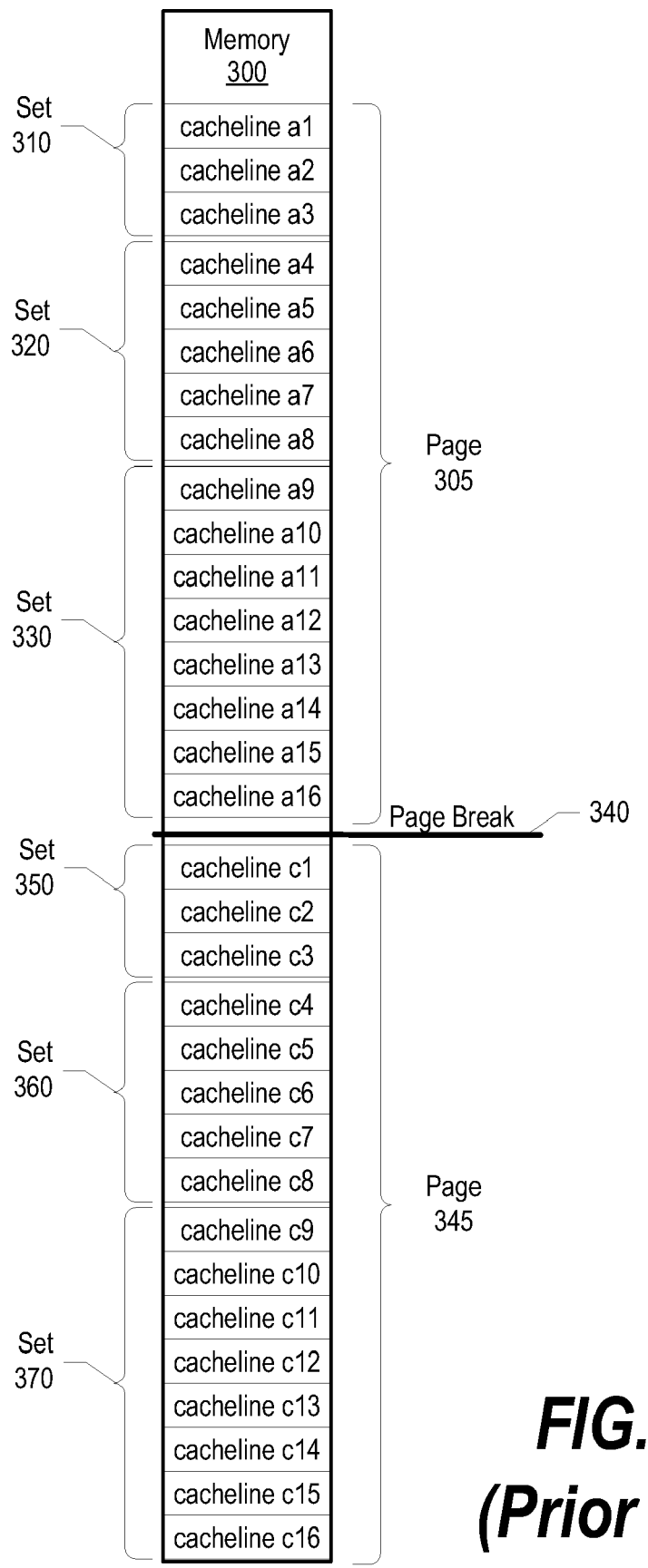
FIG. 3 is a diagram showing existing art conservatively prefetching cache lines at the beginning of each real page according to a "normal" startup profile, regardless of whether the prefetch requests are a continuation of a data stream corresponding to a different page.

FIG. 3 is a diagram showing existing art conservatively prefetching cache lines at the beginning of each real page according to a "normal" startup profile, regardless of whether the prefetch requests are a continuation of a data stream corresponding to a different page.

When a prefetch engine is in a normal startup profile and a program loads line "I," the prefetch engine speculates that the program might next load line I+1 and record the address for line I+1 in a prefetch request queue. When the program sometime later loads an address in line I+1, the prefetch logic detects the load and might send an L1 prefetch for line I+2 while also setting the address in the prefetch request queue to line I+2 (advancing the address in the request queue to the next line it expects the program to load). When the program later loads an address from line I+2, the prefetch engine might send an L1 prefetch for line I+3 and I+4, and L2 prefetches for lines I+5 and I+6, etc. Note, however, that the prefetch engine does not prefetch across a page boundary. As such, once the prefetch engine reaches a page boundary, the prefetch engine terminates its prefetching.

FIG. 3 shows that at the beginning of a page (page 305), existing art starts prefetching cache lines in a "Normal" startup profile, which prefetches a relatively small number of cachelines (set 310). As the prefetch engine continues to prefetch, the prefetch engine gradually increases the number of cache lines in a set of prefetch requests (set 320) until it is prefetching a predetermined number of lines ahead of the current load address. (set 330).

However, when the data stream spans page break 340 and continues on a new page (page 345), the prefetch engine reverts back to generating a small set of prefetch requests according to the "Normal" startup profile at the beginning of the new page (set 350). This is due to the fact that the prefetch engine is tracking, for simplicity, real addresses in the prefetch request queues and there is a discontinuity in real addresses at the page boundaries as just described. In turn, existing art eventually increases the number of cache lines for a given set of prefetch requests (set 360) until it completes prefetching cachelines (set 370). As can be seen, added latency may occur because the prefetch engine generates a relatively small number of prefetch requests each time it begins a new real page, regardless of whether it is a continuation of a data stream that is in process of being retrieved.

Figure 4:
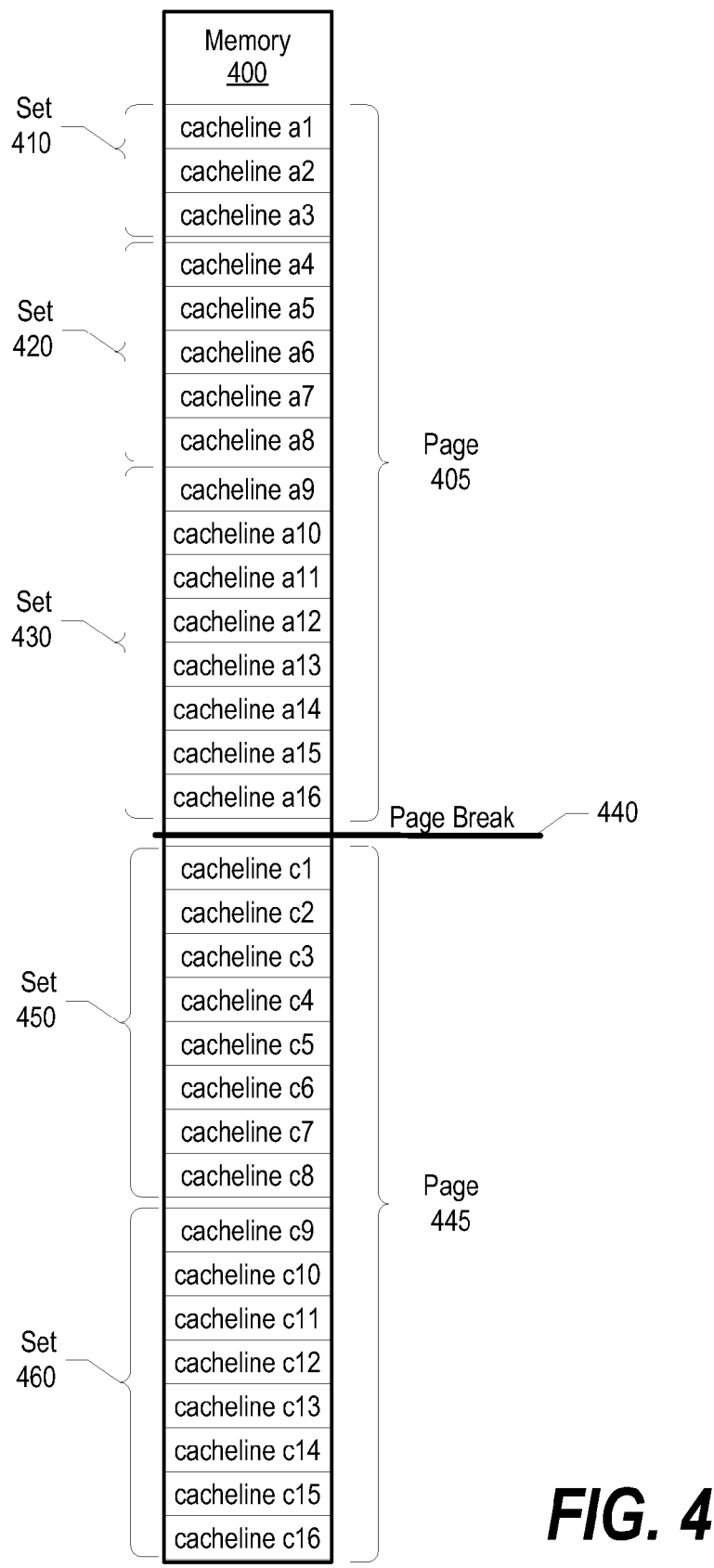
FIG. 4 is a diagram showing a prefetch engine aggressively prefetching cache lines at the beginning of a real page when the cache lines are a continuation of a data stream that is in process of being retrieved.

FIG. 4 is a diagram showing a prefetch engine aggressively prefetching cache lines at the beginning of a real page when the cache lines are speculated to be a continuation of a data stream that is in process of being retrieved.

The invention described herein starts prefetching cache lines according to a normal startup profile from page 405 (set 410), and gradually increases the number of cache lines for a given set of prefetch requests (set 420), until it is prefetching a given number of cache lines ahead of the current load address. (set 430). When the prefetch engine detects that an address reaches a page boundary, such as the last line in a page, the prefetch engine pushes a page boundary value of "1" into a FIFO queue and resets the value of the bit to "0". In turn, when the prefetch engine detects a new address at the beginning of a new page, the prefetch engine analyzes the page boundary values included in the FIFO queue to determine the likelihood that the new address is a continuation of a data stream. If so, the prefetch engine commences prefetching according to an aggressive startup profile (set 450) until prefetching completes (prefetch 460).

FIG. 5 is a flowchart showing steps taken in processing a load instruction. Processing commences at 500, whereupon processing fetches an instruction from a program in memory and decodes the instruction (step 505). A determination is made as to whether the instruction is a load instruction (decision 510). If the instruction is not a load instruction, decision 510 branches to "No" branch 512, which loops back to fetch and decode another instruction.

On the other hand, if the instruction is a load instruction, decision 510 branches to "Yes" branch 514 whereupon processing sends a real address corresponding to the load instruction to a prefetch engine, such as prefetch engine 140 shown in FIG. 1 (step 515). The prefetch engine compares the real address with prefetch request queue entries included in a prefetch request queue, such as prefetch request queue 150 shown in FIG. 1.

A determination is made as to whether the real address matches an address included in one of the prefetch request queue entries (decision 520). If the real address matches an address in one of the prefetch request queue entries, decision 520 branches to "Yes" branch 522 whereupon processing advances the state of the matched prefetch request queue entry, which includes advancing the address in the matched prefetch request queue to the address of the expected next line in the stream, and generating a set of prefetch requests according to its state (step 525). For example, if the current real address corresponds to cache line N, then processing replaces N with an address of line N+1 for an ascending stream, or with an address of line N−1 for a descending stream.

A determination is made as to whether the address is at a page boundary, such as the first or last line in a page (decision 530). If the address is at a page boundary, decision 530 branches to "Yes" branch 532 whereupon processing sets a page boundary value bit (register) included in the prefetch request queue entry to "1" (step 535), which processing subsequently uses to select a prefetch startup profile (discussed below). On the other hand, if the address is not at a page boundary, decision 530 branches to "No" branch 538 bypassing page boundary value bit-setting steps.

Referring back to decision 520, if the load instruction's real address does not match one of the prefetch request queue entries, decision 520 branches to "No" branch 524, whereupon a determination is made as to whether the real address corresponds to a cache line currently within an L1 data cache, such as L1 data cache 110 shown in FIG. 1 (decision 550). If the real address corresponds to a cache line located in the L1 cache, no prefetch is required, no stream needs to be initiated, and decision 550 branches to "Yes" branch 552, which loops back to process another instruction.

On the other hand, if the address corresponding to the load instruction is not located in the L1 cache, decision 550 branches to "No" branch 558 whereupon a determination is made as to whether the real address is included in a load miss queue, such as load miss queue 120 shown in FIG. 1 (decision 560). If the address is in the load miss queue, indicating that a load to the cache line has already been processed and/or a prefetch has already been requested for the real address, decision 560 branches to "Yes" branch 562, which loops back to process another instruction.

Figure 6:
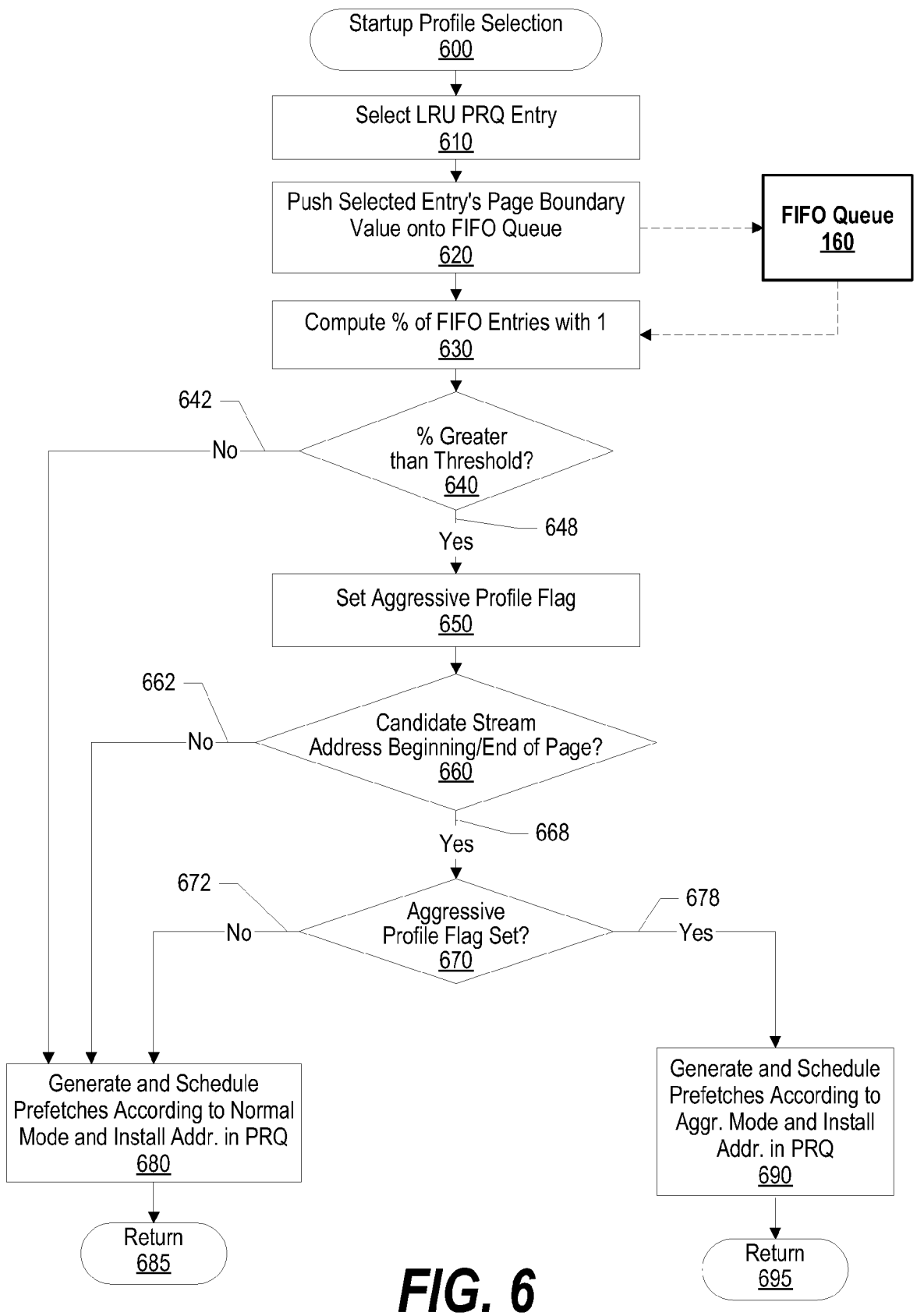
FIG. 6 is a flowchart showing steps taken in selecting a prefetch startup profile.

On the other hand, if the address is not in the load miss queue, decision 560 branches to "No" branch 568, whereupon processing selects a prefetch startup profile, such as a normal startup profile or an aggressive startup profile (predefined process block 570, see FIG. 6 and corresponding text for further details).

A determination is made as to whether to continue processing (decision 580). If processing should continue, decision 580 branches to "Yes" branch 582, which loops back to process more instructions. This looping continues until processing should terminate, at which point decision 580 branches to "No" branch 588 whereupon processing ends at 590.

FIG. 6 is a flowchart showing steps taken in selecting a prefetch startup profile. In one embodiment, the invention described herein aggressively prefetches cache lines contingent upon specific historical stream information. In this embodiment, a page boundary value bit associated with each prefetch request queue entry is pushed into a FIFO queue upon selecting a prefetch request queue for a new stream. The M entries of 0 or 1 in the FIFO queue are used for qualifying new data streams as to whether they should be prefetched using a normal startup profile or an aggressive startup profile.

Processing commences at 600, whereupon processing, at step 610, selects a prefetch request queue entry based upon a least-recently-used (LRU) algorithm to install an address corresponding to a next expected address (either N+1 if the stream is predicted to be ascending or N−1 if the stream is predicted to be descending). The LRU algorithm identifies a prefetch request queue entry that has not had an address match in the longest number of cycles compared with the other prefetch request queue entries.

At step 620, processing pushes the selected entry's page boundary value bit of "0" or "1" into FIFO 160 according to whether the selected PRQ entry had ended at the end of a page, and resets the page boundary value bit in the PRQ to "0." At step 630, processing computes a "historical page boundary percentage" by calculating the percentage of page boundary values included in FIFO queue 160 that are "1" versus those that are a "0." The calculation identifies the percentage of times that a previous address historically reached a page boundary (see FIG. 5 and corresponding text for further details).

A determination is made as to whether the historical page boundary percentage is greater than a historical page boundary threshold, such as 70% (decision 640). If the historical page boundary percentage is not greater than the historical page boundary threshold, decision 640 branches to "No" branch 642 whereupon processing generates and schedules a set of prefetch requests according to a "Normal" startup profile (step 680), and processing returns at 685. On the other hand, if the historical page boundary percentage is greater than the historical page boundary threshold, decision 640 branches to "Yes" branch 648 whereupon processing sets an aggressive profile flag (step 650), which processing subsequently uses as a determinant to set an aggressive startup profile (discussed below).

A determination is made as to whether the address corresponding to the load instruction is a candidate for an aggressive startup profile (decision 660). First, processing checks the address to identify whether the address is the first or last cache line in a page and if so, whether the guessed direction is compatible with a data stream (e.g., if it the first line and ascending).

If the address corresponding to the load instruction is not a candidate for an aggressive startup profile, decision 660 branches to "No" branch 662 whereupon processing generates and schedules a set of prefetch requests according to a "Normal" startup profile (step 680). On the other hand, if the address corresponding to the load is a candidate for an aggressive startup profile, decision 660 branches to "Yes" branch 668.

A determination is made as to whether the aggressive profile flag is set (decision 670). If the aggressive profile flag is not set, decision 670 branches to "No" branch 672 whereupon processing generates and schedules a set of prefetch requests according to a "Normal" startup profile (step 680). On the other hand, if the aggressive profile flag is set, decision 670 branches to "Yes" branch 678 whereupon processing generates and schedules a set of prefetch requests according to an "Aggressive" startup profile (step 690), and processing returns at 695.

Figure 7:
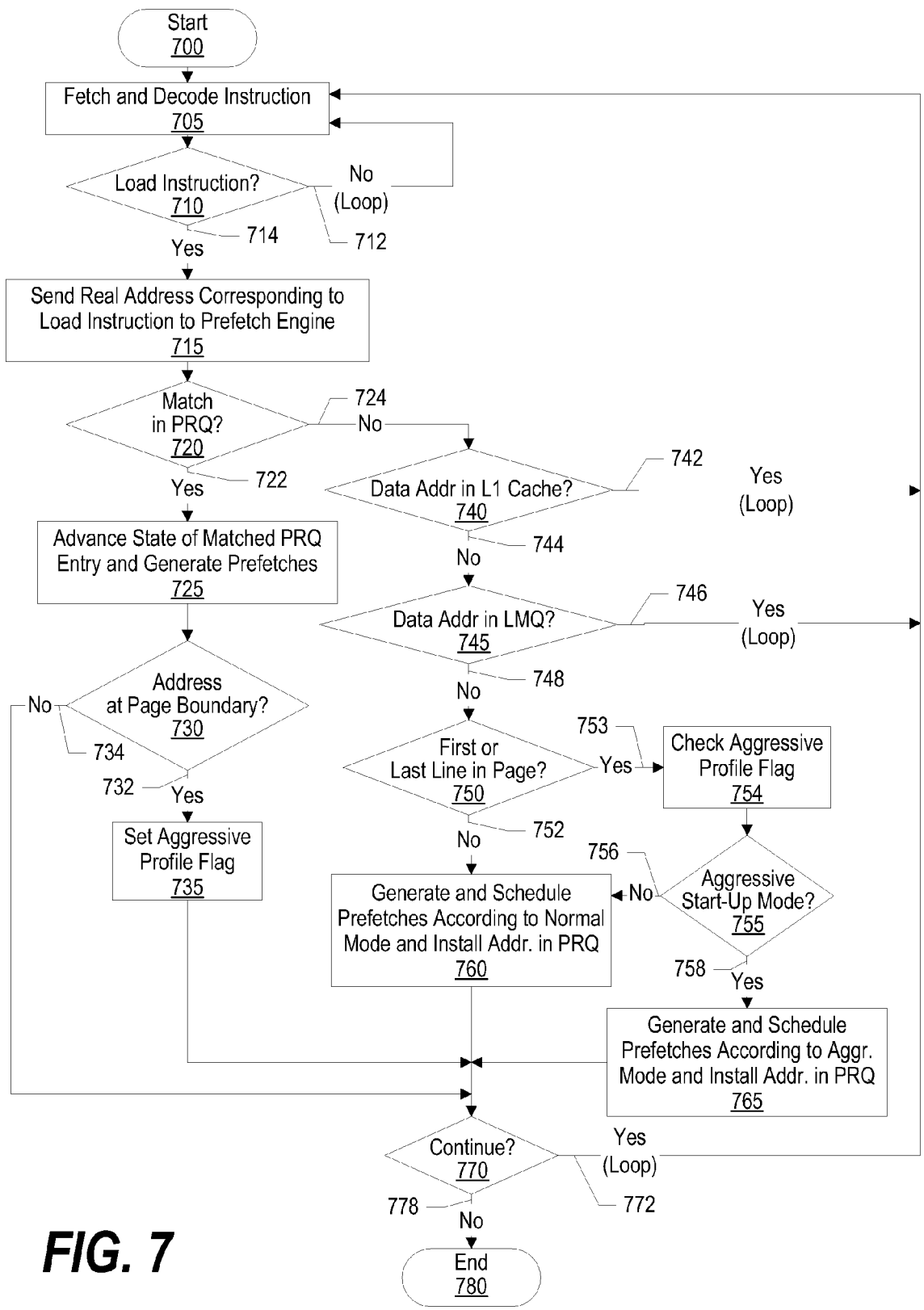
FIG. 7 is a flowchart showing steps taken in an embodiment for identifying a time at which a data stream's prefetched cache lines approach a page boundary, and aggressively prefetching the data stream's subsequent cache lines that resume on a different real page of data.

FIG. 7 is a flowchart showing steps taken in an embodiment for identifying a time at which a data stream's prefetched cache lines approach a page boundary, and aggressively prefetching the data stream's subsequent cache lines that resume on a different real page of data. The flowchart shown in FIG. 7 is a simplified embodiment of the invention described herein compared with the embodiment shown in FIG. 5.

Processing commences at 700, whereupon processing fetches an instruction from a program in memory and decodes the instruction (step 705). A determination is made as to whether the instruction is a load instruction (decision 710). If the instruction is not a load instruction, decision 710 branches to "No" branch 712, which loops back to fetch and decode another instruction. On the other hand, if the instruction is a load instruction, decision 710 branches to "Yes" branch 714 whereupon processing sends a real address corresponding to the load instruction to a prefetch engine at step 715. The prefetch engine compares the real address with prefetch request queue entries included in a prefetch request queue.

A determination is made as to whether the real address matches an address included in one of the prefetch request queue entries (decision 720). If the real address matches an address in one of the prefetch request queue entries, decision 720 branches to "Yes" branch 722 whereupon processing advances the state of the matched prefetch request queue entry, which includes advancing the address in the matched prefetch request queue to the address of the expected next line in the stream, and generating a set of prefetch requests according to its state (step 725).

A determination is made as to whether the address is at a page boundary, such as the first or last line in a page depending upon whether the data stream is ascending or descending, respectively (decision 730). If the address is at a page boundary, decision 730 branches to "Yes" branch 732 whereupon processing sets an aggressive profile flag at step 735. Processing subsequently analyzes the aggressive profile flag to select a prefetch startup profile (discussed below). On the other hand, if the address is not at a page boundary, decision 730 branches to "No" branch 734 bypassing aggressive profile flag setting steps.

Referring back to decision 720, if the load instruction's real address does not match one of the prefetch request queue entries, decision 720 branches to "No" branch 724, whereupon a determination is made as to whether the real address corresponds to a cache line currently within an L1 data cache, such as L1 data cache 110 shown in FIG. 1 (decision 740). If the real address corresponds to a cache line located in the L1 cache, no prefetch is required, no stream needs to be initiated, and decision 740 branches to "Yes" branch 742, which loops back to process another instruction.

On the other hand, if the address corresponding to the load instruction is not located in the L1 cache, decision 740 branches to "No" branch 744 whereupon a determination is made as to whether the real address is included in a load miss queue, such as load miss queue 120 shown in FIG. 1 (decision 745). If the address is in the load miss queue, indicating that a load to the cache line has already been processed and/or a prefetch has already been requested for the real address, decision 745 branches to "Yes" branch 746, which loops back to process another instruction.

On the other hand, if the address is not in the load miss queue, decision 745 branches to "No" branch 748, whereupon a determination is made as to whether the real address corresponds to a first line or a last line of a real page of memory (page boundary) (decision 750). When the address corresponds to a first line or a last line of a page, the address may be a continuation of a data stream that is in process of being retrieved.

If the real address does not correspond to a first line or a last line in a page, decision 750 branches to "No" branch 752 whereupon processing generates and schedules a set of prefetch requests according to a "Normal" startup profile, and installs the real address in a prefetch request queue entry.

On the other hand, if the real address corresponds to a first line or a last line in a page, decision 750 branches to "Yes" branch 753 whereupon processing checks the state of the aggressive profile flag. As discussed above in this embodiment, processing sets the aggressive profile flag when an address included in a previous prefetch request reaches an end or a beginning of page boundary.

A determination is made as to whether the aggressive profile flag is set (decision 755). If the aggressive profile flag is set, decision 755 branches to "Yes" branch 758 whereupon processing generates and schedules a set of prefetch requests according to an "Aggressive" startup profile, and installs the address, along with an aggressive initial state, in one of the prefetch request queue entries (step 765). Processing then resets the state of the aggressive profile flag.

On the other hand, if the aggressive profile flag is not set, indicating that a previous prefetch was not at page boundary, decision 755 branches to "No" branch 756 whereupon processing generates and schedules a set of prefetch requests according to a "Normal" startup profile, and installs the address in a prefetch request queue entry (step 760).

A determination is made as to whether to continue processing (decision 770). If processing should continue, decision 770 branches to "Yes" branch 772, which loops back to process more instructions. This looping continues until processing should terminate, at which point decision 770 branches to "No" branch 778 whereupon processing ends at 780.

Figure 8:
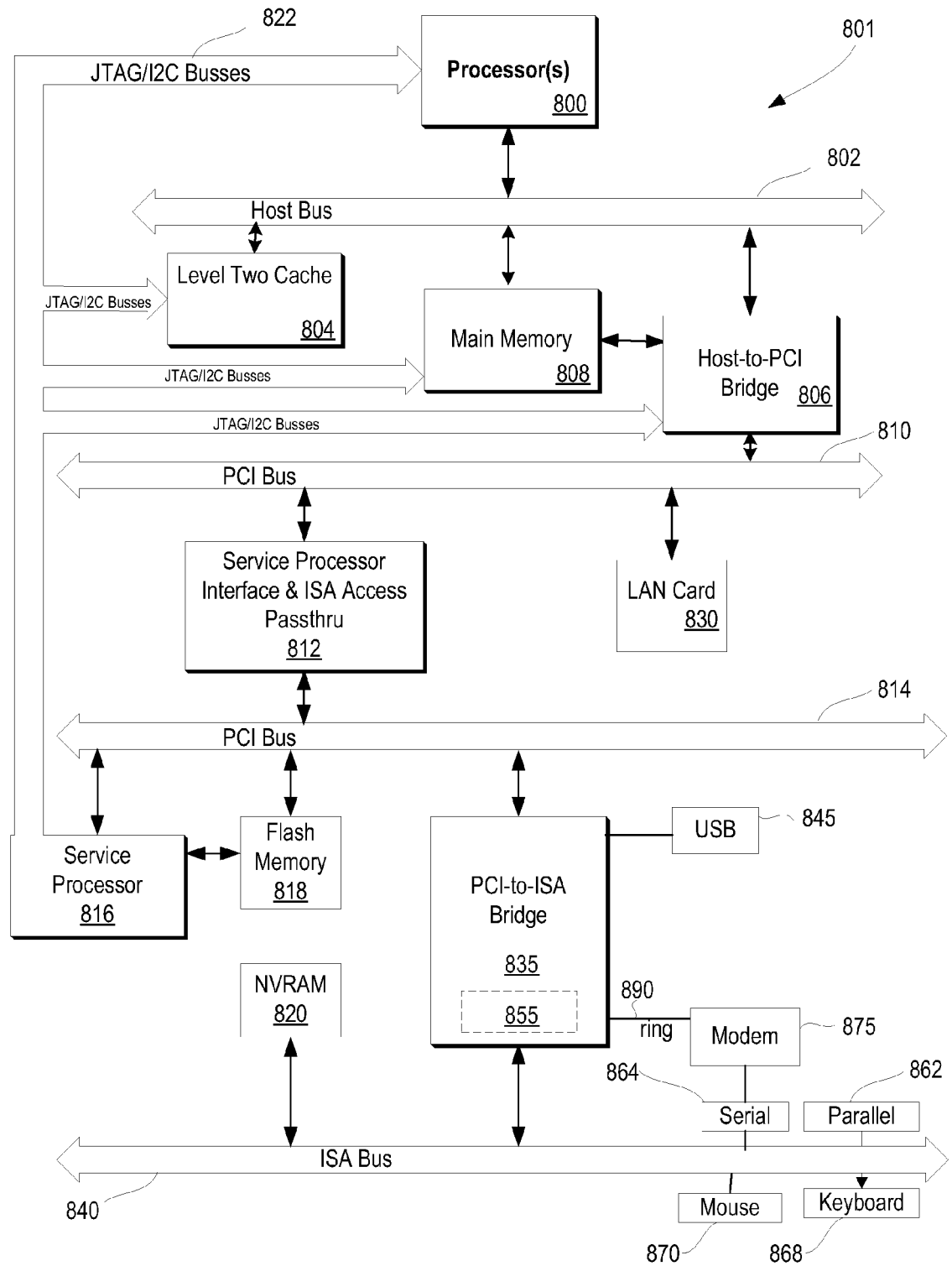
FIG. 8 is a block diagram of a computing device capable of implementing the present invention.

FIG. 8 illustrates information handling system 801 which is a simplified example of a computer system capable of performing the computing operations described herein. Computer system 801 includes processor 800 which is coupled to host bus 802. A level two (L2) cache memory 804 is also coupled to host bus 802. Host-to-PCI bridge 806 is coupled to main memory 808, includes cache memory and main memory control functions, and provides bus control to handle transfers among PCI bus 810, processor 800, L2 cache 804, main memory 808, and host bus 802. Main memory 808 is coupled to Host-to-PCI bridge 806 as well as host bus 802. Devices used solely by host processor(s) 800, such as LAN card 830, are coupled to PCI bus 810. Service Processor Interface and ISA Access Pass-through 812 provides an interface between PCI bus 810 and PCI bus 814. In this manner, PCI bus 814 is insulated from PCI bus 810. Devices, such as flash memory 818, are coupled to PCI bus 814. In one implementation, flash memory 818 includes BIOS code that incorporates the necessary processor executable code for a variety of low-level system functions and system boot functions.

PCI bus 814 provides an interface for a variety of devices that are shared by host processor(s) 800 and Service Processor 816 including, for example, flash memory 818. PCI-to-ISA bridge 835 provides bus control to handle transfers between PCI bus 814 and ISA bus 840, universal serial bus (USB) functionality 845, power management functionality 855, and can include other functional elements not shown, such as a real-time clock (RTC), DMA control, interrupt support, and system management bus support. Nonvolatile RAM 820 is attached to ISA Bus 840. Service Processor 816 includes JTAG and I2C busses 822 for communication with processor(s) 800 during initialization steps. JTAG/I2C busses 822 are also coupled to L2 cache 804, Host-to-PCI bridge 806, and main memory 808 providing a communications path between the processor, the Service Processor, the L2 cache, the Host-to-PCI bridge, and the main memory. Service Processor 816 also has access to system power resources for powering down information handling device 801.

Peripheral devices and input/output (I/O) devices can be attached to various interfaces (e.g., parallel interface 862, serial interface 864, keyboard interface 868, and mouse interface 870 coupled to ISA bus 840. Alternatively, many I/O devices can be accommodated by a super I/O controller (not shown) attached to ISA bus 840.

In order to attach computer system 801 to another computer system to copy files over a network, LAN card 830 is coupled to PCI bus 810. Similarly, to connect computer system 801 to an ISP to connect to the Internet using a telephone line connection, modem 875 is connected to serial port 864 and PCI-to-ISA Bridge 835.

While FIG. 8 shows one information handling system that employs processor(s) 800, the information handling system may take many forms. For example, information handling system 801 may take the form of a desktop, server, portable, laptop, notebook, or other form factor computer or data processing system. Information handling system 801 may also take other form factors such as a personal digital assistant (PDA), a gaming device, ATM machine, a portable telephone device, a communication device or other devices that include a processor and memory.

One of the preferred implementations of the invention is a client application, namely, a set of instructions (program code) in a code module that may, for example, be resident in the random access memory of the computer. Until required by the computer, the set of instructions may be stored in another computer memory, for example, in a hard disk drive, or in a removable memory such as an optical disk (for eventual use in a CD ROM) or floppy disk (for eventual use in a floppy disk drive), or downloaded via the Internet or other computer network. Thus, the present invention may be implemented as a computer program product for use in a computer. In addition, although the various methods described are conveniently implemented in a general purpose computer selectively activated or reconfigured by software, one of ordinary skill in the art would also recognize that such methods may be carried out in hardware, in firmware, or in more specialized apparatus constructed to perform the required method steps.

While particular embodiments of the present invention have been shown and described, it will be obvious to those skilled in the art that, based upon the teachings herein, that changes and modifications may be made without departing from this invention and its broader aspects. Therefore, the appended claims are to encompass within their scope all such changes and modifications as are within the true spirit and scope of this invention. Furthermore, it is to be understood that the invention is solely defined by the appended claims. It will be understood by those with skill in the art that if a specific number of an introduced claim element is intended, such intent will be explicitly recited in the claim, and in the absence of such recitation no such limitation is present. For non-limiting example, as an aid to understanding, the following appended claims contain usage of the introductory phrases "at least one" and "one or more" to introduce claim elements. However, the use of such phrases should not be construed to imply that the introduction of a claim element by the indefinite articles "a" or "an" limits any particular claim containing such introduced claim element to inventions containing only one such element, even when the same claim includes the introductory phrases "one or more" or "at least one" and indefinite articles such as "a" or "an"; the same holds true for the use in the claims of definite articles.

What is claimed is:

1. A computer-implemented method for prefetching data in a data processing system, the method comprising:
generating a plurality of page boundary values for a plurality of prior data streams, wherein each of the plurality of page boundary values indicate whether a corresponding data stream logically reached a page boundary;
detecting a new data stream;
in response to detecting the new data stream, analyzing the plurality of page boundary values, the analysis resulting in a historical page boundary percentage;
comparing the historical page boundary percentage to a historical page boundary threshold; and
selecting a prefetch startup profile for the new data stream based upon the comparison.

2. The method of claim 1 wherein, for each of the plurality of the prior data streams, the method further comprises:
generating a real address for the prior data stream;
detecting whether the real address terminates at the page boundary;
in response to detecting that the real address terminates at the page boundary, storing the page boundary value of 1 in a register; and
in response to detecting that the stream does not terminate at the page boundary, storing the page boundary value of 0 into the register.

3. The method of claim 2 further comprising:
wherein the page boundary is a last line in a page when the prior data stream is ascending; and
wherein the page boundary is a first line in a page when the prior data stream is descending.

4. The method of claim 2 wherein, prior to the analysis, the method further comprises:
identifying a least recently used prefetch request queue entry;
reallocating the identified least recently used prefetch request queue entry to the new data stream; and
in response to reallocating the least recently used prefetch request queue to the new data stream, storing the page boundary value from the register into a FIFO queue.

5. The method of claim 4 wherein the historical page boundary percentage is the number of page boundary values that equal 1 compared with the total number of page boundary values included in the FIFO queue.

6. The method of claim 1 further comprising:
generating a real address for the new data stream;
in response to detecting that the new data stream is ascending and that the address corresponds to a first line of a page, generating an initial set of prefetches corresponding to the new data stream according to an aggressive startup profile; and
in response to detecting that the new data stream is descending and that the address corresponds to a last line of a page, generating the initial set of prefetches corresponding to the new data stream according to the aggressive startup profile.

7. A computer-implemented method for prefetching data in a data processing system, the method comprising:
generating a real address for a prior data stream;
detecting whether the real address terminates at a page boundary of a first page;
in response to detecting that the real address terminates at the page boundary of the first page, setting an aggressive profile flag;
detecting a new data stream; and
selecting an aggressive startup profile for the new data stream in response to setting the aggressive profile flag.

8. The computer-implemented method of claim 7 further comprising:
determining that the new data stream corresponds to a first cache line located at the beginning of a second page; and
performing the selection of the aggressive startup profile in response to determining that the new data stream corresponds to the first cache line located at the beginning of the second page.

9. The method of claim 8 wherein the first page and the second page are discontiguous.

10. The method of claim 7 further comprising:
wherein the page boundary is a last line in a page when the prior data stream is ascending; and wherein the page boundary is a first line in a page when the prior data stream is descending.

11. A computer program product stored on a computer operable media, the computer operable media containing instructions for execution by a computer, which, when executed by the computer, cause the computer to implement a method of improving page crossing performance, the method comprising:
generating a plurality of page boundary values for a plurality of prior data streams, wherein each of the plurality of page boundary values indicate whether a corresponding data stream logically reached a page boundary;
detecting a new data stream;
in response to detecting the new data stream, analyzing the plurality of page boundary values, the analysis resulting in a historical page boundary percentage;
comparing the historical page boundary percentage to a historical page boundary threshold; and
selecting a prefetch startup profile for the new data stream based upon the comparison.

12. The computer program product of claim 11 wherein, for each of the plurality of the prior data streams, the method further comprises:
generating a real address for the prior data stream;
detecting whether the real address terminates at the page boundary;
in response to detecting that the real address terminates at the page boundary, storing the page boundary value of 1 in a register; and
in response to detecting that the stream does not terminate at the page boundary, storing the page boundary value of 0 into the register.

13. The computer program product of claim 12 wherein the method further comprises:
wherein the page boundary is a last line in a page when the prior data stream is ascending; and
wherein the page boundary is a first line in a page when the prior data stream is descending.

14. The computer program product of claim 12 wherein, prior to the analysis, the method further comprises:
identifying a least recently used prefetch request queue entry;
reallocating the identified least recently used prefetch request queue entry to the new data stream; and
in response to reallocating the least recently used prefetch request queue to the new data stream, storing the page boundary value from the register into the FIFO queue.

15. The computer program product of claim 14 wherein the historical page boundary percentage is the number of page boundary values that equal 1 compared with the total number of page boundary values included in a FIFO queue.

16. The computer program product of claim 11 wherein the method further comprises:
generating a real address for the new data stream;
in response to detecting that the new data stream is ascending and that the address corresponds to a first line of a page, generating an initial set of prefetches corresponding to the new data stream according to an aggressive startup profile; and
in response to detecting that the new data stream is descending and that the address corresponds to a last line of a page, generating the initial set of prefetches corresponding to the new data stream according to the aggressive startup profile.

17. An information handling system comprising:
one or more processors;
a memory accessible by the processors;
a register;
one or more nonvolatile storage devices accessible by the processors; and
a set of instructions stored in the memory, wherein one or more of the processors executes the set of instructions in order to perform actions of:
generating a plurality of page boundary values for a plurality of prior data streams, wherein each of the plurality of page boundary values indicate whether a corresponding data stream logically reached a page boundary;
detecting a new data stream;
in response to detecting the new data stream, analyzing the plurality of page boundary values, the analysis resulting in a historical page boundary percentage;
comparing the historical page boundary percentage to a historical page boundary threshold; and
selecting a prefetch startup profile for the new data stream based upon the comparison.

18. The information handling system of claim 17 wherein, for each of the plurality of the prior data streams, further comprising an additional set of instructions in order to perform actions of:
generating a real address for the prior data stream;
detecting whether the real address terminates at the page boundary;
in response to detecting that the real address terminates at the page boundary, storing the page boundary value of 1 in the register; and
in response to detecting that the stream does not terminate at the page boundary, storing the page boundary value of 0 into the register.

19. The information handling system of claim 18 further comprising an additional set of instructions in order to perform actions of:
wherein the page boundary is a last line in a page when the prior data stream is ascending; and
wherein the page boundary is a first line in a page when the prior data stream is descending.

20. The information handling system of claim 18 wherein, prior to the analysis, further comprising an additional set of instructions in order to perform actions of:
identifying a least recently used prefetch request queue entry;
reallocating the identified least recently used prefetch request queue entry to the new data stream; and
in response to reallocating the least recently used prefetch request queue to the new data stream, storing the page boundary value from the register into a FIFO queue.

* * * * *